United States Patent
Yang et al.

(10) Patent No.: US 11,658,921 B2
(45) Date of Patent: May 23, 2023

(54) METHOD AND DEVICE OF NETWORK RESOURCE ALLOCATION

(71) Applicant: Beijing University of Posts and Telecommunications, Beijing (CN)

(72) Inventors: Hui Yang, Beijing (CN); Bowen Bao, Beijing (CN); Qiuyan Yao, Beijing (CN); Chao Li, Beijing (CN); Zhengjie Sun, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 151 days.

(21) Appl. No.: 17/403,479

(22) Filed: Aug. 16, 2021

(65) Prior Publication Data
US 2022/0368650 A1   Nov. 17, 2022

(30) Foreign Application Priority Data

May 11, 2021   (CN) .......................... 202110527212.5
Jul. 13, 2021   (CN) .......................... 202110790242.5

(51) Int. Cl.
*H04L 47/70* (2022.01)
*G06N 3/02* (2006.01)
*H04L 41/147* (2022.01)

(52) U.S. Cl.
CPC ............. *H04L 47/823* (2013.01); *G06N 3/02* (2013.01); *H04L 41/147* (2013.01)

(58) Field of Classification Search
CPC . H04L 47/823; H04L 41/147; H04L 43/0817; G06N 3/02; G06N 3/045; G06N 3/08; G06Q 10/06315; G06Q 50/30; G06F 17/16
See application file for complete search history.

(56) References Cited

U.S. PATENT DOCUMENTS

| | | | | |
|---|---|---|---|---|
| 8,606,727 | B2* | 12/2013 | Wu | G08G 1/0104 706/12 |
| 2004/0010582 | A1* | 1/2004 | Oliver | H04M 3/493 709/224 |
| 2014/0229210 | A1* | 8/2014 | Sharifian | G06Q 10/0631 705/7.29 |
| 2016/0219066 | A1* | 7/2016 | Vasseur | H04L 63/1458 |
| 2021/0064999 | A1* | 3/2021 | Liu | G06N 3/084 |
| 2021/0273858 | A1* | 9/2021 | Radovanovic | H02J 3/00 |

FOREIGN PATENT DOCUMENTS

WO    WO-2021186158 A1 *  9/2021  ............... G06N 3/04

\* cited by examiner

*Primary Examiner* — Javier O Guzman
(74) *Attorney, Agent, or Firm* — Westbridge IP LLC

(57) ABSTRACT

Disclosed is a method of network resource allocation. The method includes: generating an adjacency matrix of nodes in a metropolitan area network (MAN) according to spatial adjacency relationships of the nodes; generating a network state feature matrix according to traffic information of each node; extracting traffic spatial features of the nodes from the adjacency matrix and the network state feature matrix through a traffic spatial feature extraction model; obtaining predicted traffic of the nodes from the traffic spatial features through a traffic prediction model; and performing a network resource allocation according to the predicted traffic of the nodes. Further, a device of network resource allocation and a non-transitory computer-readable storage medium are also disclosed.

18 Claims, 5 Drawing Sheets

METHOD AND DEVICE OF NETWORK RESOURCE ALLOCATION

CROSS-REFERENCE TO RELATED APPLICATIONS

The present application claims priority to Chinese Patent Application CN202110527212.5, filed on May 11, 2021 and priority to Chinese Patent Application CN202110790242.5, filed on Jul. 13, 2021, the entire contents of which are incorporated herein by reference.

TECHNICAL FIELD

The present disclosure relates to a metropolitan area network (MAN) resource control, in particular to a method and a device of network resource allocation in a MAN based on traffic prediction.

BACKGROUND

Driven by a development of urbanization, a large number of urban and rural populations have migrated to cities and towns. In this case, the density of the urban population increases year by year.

Benefiting from rapidly developed wireless mobile communication and optical communication technologies, a lot of new network devices have been connected to the MAN. As a result, traffic of a MAN has risen sharply with the increase of population, which brings great challenge to network resource allocations of the MAN.

In view of the fact that locations of offices and residences of urban people are usually divided by regions, traffic trends of the MAN would change correspondingly with personnel flows which forms an obvious traffic tide phenomenon.

In existing network resource allocation schemes in a MAN, areas are often divided according to their geographic locations. These schemes cannot analyze influences of actual network traffic tides. Therefore, the existing network resource allocation schemes in the MAN may have shortcomings of one-sided prediction, inaccurate extraction of traffic features, imbalance in network resource allocation and utilization, and etc.

SUMMARY

In view of the above, the present disclosure provides a method of network resource allocation. The method of network resource allocation according to examples of the present disclosure may include: generating an adjacency matrix of nodes in a MAN according to spatial adjacency relationships of the nodes; generating a network state feature matrix according to traffic information of each node; extracting traffic spatial features of the nodes from the adjacency matrix and the network state feature matrix through a traffic spatial feature extraction model; obtaining predicted traffic of the nodes from the traffic spatial features through a traffic prediction model; and performing a network resource allocation according to the predicted traffic of the nodes.

Examples of the present disclosure further provide a device of network resource allocation. The device may include a memory, a processor, and a computer program stored in the memory and executable on the processor, wherein the processor executes the program to implement the method of network resource allocation disclosed.

Based on the same concept, the present disclosure may further provide a non-transitory computer-readable storage medium, wherein the non-transitory computer-readable storage medium stores computer instructions, and the computer instructions being used to make the computer execute the method of network resource allocation disclosed.

It can be seen that the above method and device of network resource allocation are based on both physical connections of nodes in a MAN and traffic trends caused by personnel flows. In this way, an accuracy of network traffic prediction can be improved, foreseeing and processing capabilities of nodes for sudden traffic rushes can be enhanced, therefore resource utilization of the entire MAN system can be greatly improved.

BRIEF DESCRIPTION OF DRAWINGS

To describe the technical solutions in the present disclosure or the related arts clearly, drawings used in the description of the examples will be briefly described below. Obviously, the drawings in the description below are just examples of the present disclosure. Those of ordinary skill in the art can also obtain other drawings based on these drawings without the exercise of inventive faculty.

DETAILED DESCRIPTION OF THE EMBODIMENTS

Figure 1:
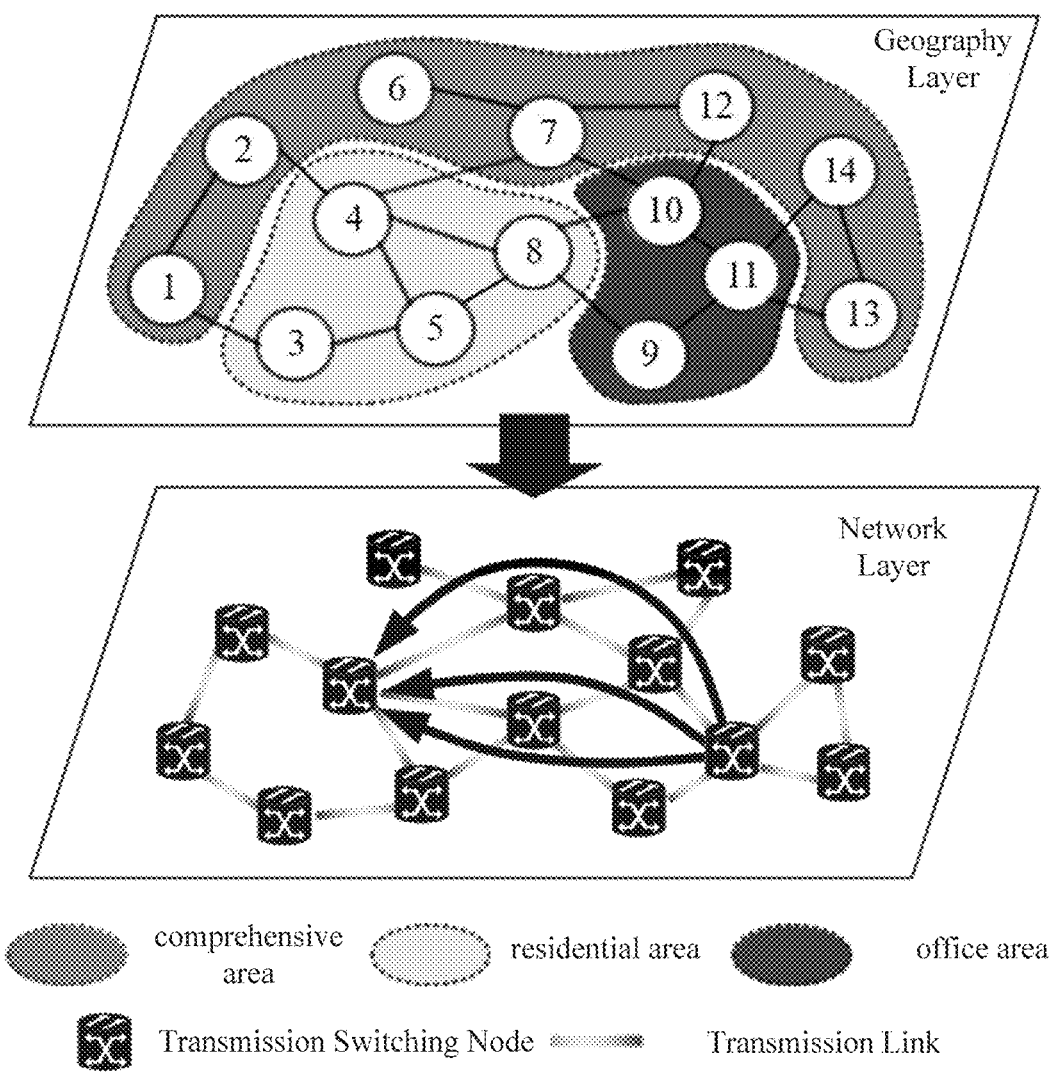
FIG. 1 illustrates an application scenario of a method of network resource allocation in a MAN according to examples of the present disclosure.

In order to make the purposes, technical solutions and advantages of the present disclosure clearer, the present disclosure is further elaborated with reference to the specific examples and the drawings in the following paragraphs.

It should be noted that, unless otherwise specified, the technical terms or scientific terms used in the examples of the present disclosure shall be understood in a usual sense by those of ordinary skill in the art. "First", "second" and the like used in the examples of the present disclosure do not indicate any order, number or importance, but are merely used to distinguish different constituent parts. "Comprises", "comprising" or other similar words imply that an element or object appearing before "comprises" or "comprising" covers enumerated elements or objects and equivalent elements thereof appearing after "comprises" or "comprising"; however, other elements or objects are not excluded. "Connection", "interconnection" and the like are not limited to physical or mechanical connection, but may include electrical connection, whether direct or indirect. "Up", "down", "left", "right" and the like are merely used to indicate a relative position relation, and when an absolute position of an object to be described changes, the relative position relation changes accordingly.

As one would understand, a MAN is a broadband local area network established within a city. The MAN would have different traffic demands in different time periods and different regions. Therefore, how to predict traffic accurately and allocate network resources reasonably are crucial issues for the MAN.

However, as mentioned above, existing method for network resource allocation of a MAN are often based on geographic locations of nodes in the MAN. Therefore, extractions of traffic spatial features corresponding to actual traffic trends among the nodes are quite difficult.

Taking into account the above considerations, examples of the present disclosure propose a method of network resource allocation in a MAN based on traffic prediction.

In this method, traffic of a MAN can be predicted through a pre-trained traffic spatial feature extraction model and a pre-trained traffic prediction model, based on both physical connections among nodes in the MAN and traffic trends due to personnel flows. Further, network resources required by nodes in the MAN can be perceived based on the traffic predicted. Therefore, a network resource allocation scheme can be customized to achieve a balance on network resources in the entire MAN system. By this method, network resources can be allocated effectively and problems of one-sided prediction, inaccurate extraction of traffic features, imbalance in resource allocation and utilization can be solved.

A clear and complete description will be made to technical solutions of the present disclosure below with reference to accompanying drawings. Apparently, the examples described are only part of the examples of the present disclosure, not all of them. Other examples obtained by a person of ordinary skill in the art based on the examples of the present disclosure without creative efforts shall fall within the scope of the present disclosure.

FIG. 1 shows an application scenario of a method of network resource allocation in a MAN based on traffic prediction according to one or more examples of the present disclosure. As shown in FIG. 1, in this application scenario, as shown in a geography layer, a geographic area within a coverage of a MAN can be divided into an office area, a residential area, and a comprehensive area.

In examples of the present disclosure, the office area refers to a geographic area of personnel daily work, and traffic in this area may increase to a peak value during working hours and decrease to a valley value during an off-duty period. The residential area refers to a geographic area of personnel daily life, and traffic in this area may increase to a peak value during the off-duty period and decrease to a valley value during working hours. Further, the comprehensive area refers to a geographic area covering personnel daily work and life, and since this area does not have specific function guidance, changes on traffic in this area are complex and without significant trends. It can be seen that, in a MAN, people may travel among different areas in their daily life. The travels of people would cause personnel flows and further cause traffic trends among different areas in the MAN.

Further, in this application scenario, as shown in a network layer, a communication network adopted would be a MAN. The MAN may include transmission links, and transmission switching nodes connected with the transmission links.

The transmission links mentioned above may refer to physical links, such as fibers, for data transmission, which serve as network transmission medium to provide transmission channels.

The transmission switching nodes may refer to uplink and downlink network edge points for network data, which are used to connect user terminals and input/output points of the transmission links. The transmission switching nodes may have the function of data exchange at ends of the transmission links. Hereinafter, in examples of the present disclosure, a transmission switching node will be expressed as a node for short.

In the above application scenario, each of the above office area, residential area, and comprehensive area may comprise one or more nodes. Further, each node may have a storage unit, a calculation unit, and a control unit.

The storage unit is an independent network module that stores historical operation data and network state graph recorded by the MAN, and can provide a data support for the calculation unit.

Specifically, in examples of the present application, the storage unit may store spatial adjacency relationships of nodes and traffic information of each node. Further, the storage unit may also store an adjacency matrix and a network state feature matrix constructed returned by the calculation unit. Wherein, the adjacency matrix and the network state feature matrix would be regarded as historical operation data and used as an input for future traffic prediction.

The calculation unit is a network analysis module that provides functions of traffic prediction and resource allocation, and can feed back analysis results to the storage unit as the historical operation data.

Specifically, in examples of the present application, the calculation unit may generate the adjacency matrix of the nodes according to the spatial adjacency relationships of the nodes, generate the network state feature matrix according to the traffic information of each node, extract traffic spatial features of the nodes from the adjacency matrix and the network state feature matrix, obtain predicted traffic of the nodes from the traffic spatial features and determine an optimal transmission path for a service request received according to the predicted traffic.

The control unit is an actual operation module that executes the analysis results of the calculation unit.

Specifically, in examples of the present application, the control unit may perform a resource allocation according to the optimal transmission path for the service request provided by the calculation unit.

In examples of the present disclosure, each node may be provided with artificial neural networks working as the traffic spatial feature extraction model and the traffic prediction model. Specifically, inputs of the traffic spatial feature extraction model may be the historical operation data from the storage unit. Outputs of the traffic prediction model may be predicted traffic of the nodes at further moments.

The traffic spatial feature extraction model in the present disclosure may be a graph convolutional network (GCN) for extracting spatial features of data. The traffic prediction model in the present disclosure may be a long and short-term memory network (LSTM), a recurrent neural network (RNN) or a gated recurrent unit (GRU) for extracting temporal features of data.

To be noted, the data format of a training set of the traffic spatial feature extraction model and the traffic prediction model can be pandas, DataFrame, csv or xlsx.

Further, each node may be provided with a data collection module to record traffic information flowing into or out of the node so as to obtain personnel flow trends between the nodes.

The method of network resource allocation in a MAN base on traffic prediction according to one or more examples of the present disclosure would be explained in detail in combination of drawings.

Figure 2:
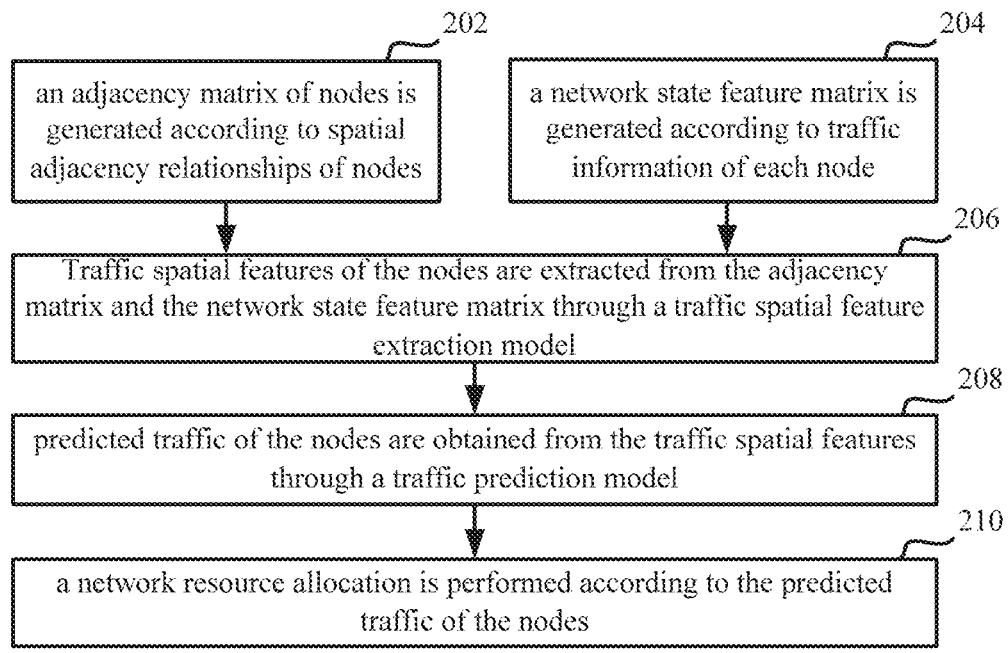
FIG. 2 is a flowchart of a method of network resource allocation according to examples of the present disclosure.

FIG. 2 illustrates a flow chart of a method of network resource allocation in a MAN base on traffic prediction according to one or more examples of the present disclosure. As shown in FIG. 2, the method may include the following steps.

In block 202, an adjacency matrix of nodes in the MAN is generated according to spatial adjacency relationships of the nodes.

In block 204, a network state feature matrix is generated according to traffic information of each of the nodes.

In some examples of the present disclosure, the adjacency matrix and the network state feature matrix generated can be stored in a database of the storage unit of a node of the MAN and used as historical data input for subsequent traffic prediction.

In block 206, traffic spatial features of the nodes are extracted from the adjacency matrix and the network state feature matrix through a traffic spatial feature extraction model.

In block 208, predicted traffic of the nodes are obtained from the traffic spatial features through a traffic prediction model.

In block 210, a network resource allocation is performed according to the predicted traffic of the nodes.

It can be seen that the above method of network resource allocation can be performed based on both physical connections among nodes in the MAN and traffic trends brought by travels of people, i.e. personnel flows. In this way, the accuracy of traffic prediction would be improved. Therefore, network resources of the MAN would be better utilized.

Implementations of each step of the above method of network resource allocation would be described in details with references to accompany drawings.

Figure 3:
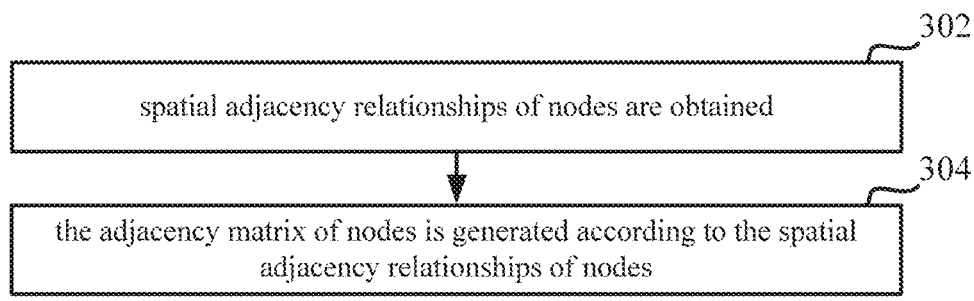
FIG. 3 illustrates a method for generating an adjacency matrix according to examples of the present disclosure.

FIG. 3 illustrates a method for generating an adjacency matrix according to examples of the present disclosure. As shown in FIG. 3, the method may include the following steps.

In block 302, spatial adjacency relationships of nodes in the MAN are obtained.

In some examples of the present disclosure, a spatial adjacency relationship of any two nodes may refer to a fact whether a physical link exists between the two nodes in the MAN.

In some other examples of the present disclosure, the spatial adjacency relationship of nodes may refer to relationships of being adjacent, being associated or being included of nodes, lines and plains in space.

In some examples of the present disclosure, the spatial adjacency relationships of nodes in the MAN can be obtained once the MAN is constructed. Moreover, the spatial adjacency relationships of nodes in the MAN would be updated while any new node or new link is established or any old node or old link is deleted from the MAN or any old node or old link is broken.

In some other examples of the present disclosure, the spatial adjacency relationships of nodes in the MAN can be obtained from a dynamic network state graph.

The dynamic network state graph may refer to a dynamic graph illustrating time-varying topologies of a network. On can understand that the dynamic network state graph can be divided into a number of static network state graphs in chronological order. A static network state graph may include nodes in the MAN, and edges among the nodes with regard to a certain time point. The edges in the static network state graph refer to physical links among the nodes.

In a MAN, there would be a managing entity which can be used to monitor the topologies of the MAN and create the dynamic network state graph of the MAN. In this case, the dynamic network state graph may be obtained from the managing entity.

In these examples of the present disclosure, since each static network state graph may be regard as a divide of the dynamic network state graph based on a specific time step. The above-mentioned block 302 may include the following steps.

First, the dynamic network state graph of the MAN is obtained.

Second, the dynamic network state graph of the MAN is divided into a number of static network state graphs based on a specific time step.

Specifically, the dynamic network state graph of the MAN can be divided into a number of static network state graphs according to a certain time step T=1. Wherein, each static network state graph corresponds to a certain time point.

Moreover, each static network state graph is analyzed to obtain nodes and edges among the nodes corresponding to the time point of the static network state graph.

Finally, the spatial adjacency relationships of nodes in the MAN at a certain time point would be obtained according to the nodes and the edges among the nodes corresponding to the time point.

One would understand, by dividing the dynamic network state graph into a plurality of static network state graphs, the dynamic network state graph can be processed and analyzed through the method for processing and analyzing static network state graphs.

In block 304, the adjacency matrix of nodes is generated according to the spatial adjacency relationships of nodes.

In some examples of the present disclosure, the adjacency matrix at a time t may be generated according to the following expression.

$$A_t = \begin{bmatrix} a_{1,1} & a_{1,2} & a_{1,3} & \cdots & a_{1,n} \\ a_{2,1} & a_{2,2} & a_{2,3} & \cdots & a_{2,n} \\ a_{3,1} & a_{3,2} & a_{3,3} & \cdots & a_{3,n} \\ \vdots & \vdots & \vdots & \ddots & \vdots \\ a_{n,1} & a_{n,2} & a_{n,3} & \cdots & a_{n,n} \end{bmatrix}$$

Wherein, $a_{i,j}$ represents a spatial adjacency relationship between node i and node j in the MAN at the time t. n represents the number of nodes in the MAN.

For example, there are 14 nodes in the MAN. Further, unique serial numbers 1, 2, . . . , 14 are defined for all the 14 nodes in the MAN.

Then, an adjacency matrix $A_t$ may be constructed at a time t according to the spatial adjacency relationships among these 14 nodes at the time t. In this example, the adjacency matrix $A_t$ can be referred to the following equation.

$$A_t = \begin{bmatrix} a_{1,1} & a_{1,2} & a_{1,3} & \cdots & a_{1,14} \\ a_{2,1} & a_{2,2} & a_{2,3} & \cdots & a_{2,14} \\ a_{3,1} & a_{3,2} & a_{3,3} & \cdots & a_{3,14} \\ \vdots & \vdots & \vdots & \ddots & \vdots \\ a_{14,1} & a_{14,2} & a_{14,3} & \cdots & a_{14,14} \end{bmatrix}$$

Wherein, $a_{i,j}$ represents a spatial adjacency relationship between node i and node j in the MAN.

Specifically, when there is a direct physical link between node i and node j in the network topology, $a_{i,j}=1$, otherwise, $a_{i,j}=0$. A line of the matrix $A_t$ represents physical connections between a node and other nodes in the MAN.

It can be seen that the adjacency matrix $A_t$ generated can reflect physical connections among the nodes in the MAN at time t. That is, through the adjacency matrix $A_t$, a graph structure of a network topology of the MAN can be depicted.

Figure 4:
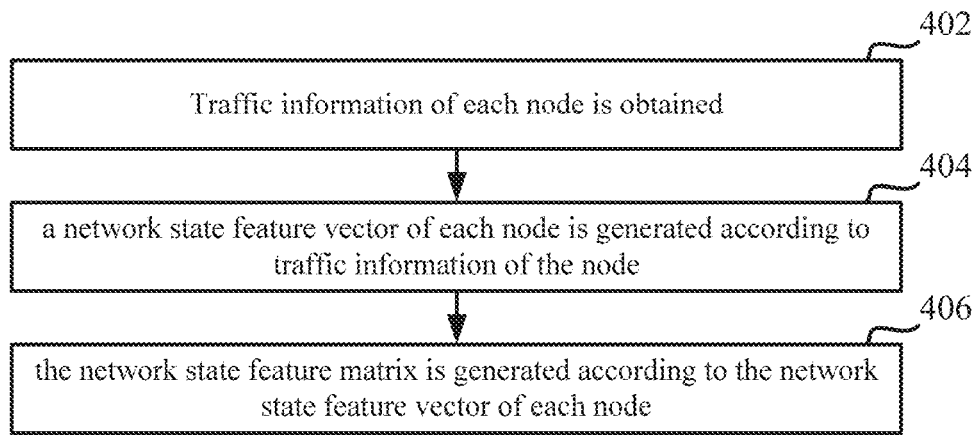
FIG. 4 illustrates a method for generating a network state feature matrix according to examples of the present disclosure.

FIG. 4 illustrates a method for generating a network state feature matrix according to examples of the present disclosure. As shown in FIG. 4, the method may include the following steps.

In block 402, traffic information of each of the nodes is obtained.

In examples of the present disclosure, the traffic information of each node in the MAN is key information to reflect traffic trends. Specifically, the traffic information may include a region to which the node belongs, a number of user terminals accessed to the node, a date, a traffic bandwidth, a transmission duration, a traffic path and etc. The traffic path may include an IP address and port number of a source node, an IP address and port number of a destination node.

In examples of the present disclosure, the traffic information may be obtained through a NetFlow technology. One would understand that the NetFlow is a network monitoring technology, through which a number of IP packets and information in and out a web interface can be obtained. In this case, the nodes of the MAN can be obtained according to the static network state graph first, and then the traffic information of each node would be further obtained through the NetFlow technology.

In block 404, a network state feature vector of each of the nodes is generated according to traffic information of the node.

In examples of the present disclosure, a dimension of a network state feature vector of a node may equal to a number of types of the traffic information of the node. For example, the traffic information of a node includes a region to which the node belongs, a number of user terminals accessed to the node, a date, a traffic bandwidth, a transmission duration and a traffic path. Therefore, in this case, the dimension of the network state feature vector of the node would be 6. Usually, network state feature vectors of the nodes in a MAN would have a same dimension.

In block 406, the network state feature matrix is generated according to the network state feature vector of each of the nodes.

In examples of the present disclosure, the network state feature matrix $Z_t$ may be generated according to the following expression.

$$Z_t = \begin{bmatrix} z_{1,1} & z_{1,2} & \cdots & z_{1,r} \\ z_{2,1} & z_{2,2} & \cdots & z_{2,r} \\ z_{3,1} & z_{3,2} & \cdots & z_{3,r} \\ \vdots & \vdots & \ddots & \vdots \\ z_{n,1} & z_{n,2} & \cdots & z_{n,r} \end{bmatrix}$$

Wherein, $z_{i,j}$ represents traffic information of node i in a $j^{th}$ dimension. n represents the number of nodes in the MAN. r represents the dimension of a network state feature vector of each node in the MAN.

Specifically, in the above example, at the time t, traffic information of the 14 nodes accessed within the coverage of the MAN can be collected and a 6-dimensional network state feature vector of each node can be recorded by the data collection module of the node. In this case, a network state feature matrix $Z_t$ can be constructed in combination with the serial numbers of the 14 nodes. In this example, the network state feature matrix $Z_t$ can be referred to the following equation.

$$Z_t = \begin{bmatrix} z_{1,1} & z_{1,2} & \cdots & z_{1,6} \\ z_{2,1} & z_{2,2} & \cdots & z_{2,6} \\ z_{3,1} & z_{3,2} & \cdots & z_{3,6} \\ \vdots & \vdots & \ddots & \vdots \\ z_{14,1} & z_{14,2} & \cdots & z_{14,6} \end{bmatrix}$$

Wherein, $z_{i,j}$ represents traffic information of node i in the $j^{th}$ dimension.

Specifically, a line of the matrix $Z_t$ represents a 6-dimensional network state feature vector of a node. Each dimension of a 6-dimensional feature vector represents a certain feature of the traffic information of the node. As described above, the 6-dimensional network state feature vector includes a series of key information that can reflect traffic trends, such as a region to which the node belongs, the number of user terminals accessed to the node, a date, a traffic bandwidth, a transmission duration, and a traffic path.

It can be seen that the network state feature matrix $Z_t$ generated can reflect traffic trends among the nodes in the MAN. That is, through the network state feature matrix $Z_t$, traffic trends among the nodes in the MAN can be depicted.

Figure 5:
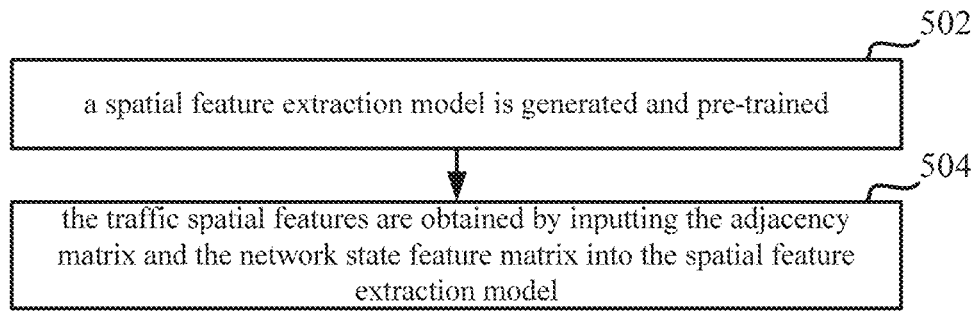
FIG. 5 illustrates a method for extracting traffic spatial features according to examples of the present disclosure.

FIG. 5 illustrates a method for extracting traffic spatial features according to examples of the present disclosure. As shown in FIG. 5, the method may include the following steps.

In block 502, a spatial feature extraction model is generated and pre-trained.

To perform a traffic prediction, spatial features in the adjacency matrix and the network state feature matrix need to be extracted. In some examples of the present disclosure, these traffic spatial features may be extracted through a spatial feature extraction model. Specifically, a Graph Convolutional Network (GCN) may be adopted as the spatial feature extraction model for one would understand that the GCN may be used to process a graph structure, i.e. a Non-Euclidean Structure, such as connections of a social network or an information network.

In examples of the present disclosure, while generating a GCN, parameters of weight matrixes of the GCN may be initialized at first. The weight matrixes at a time t of a GCN may include two weight matrixes: $M_t^0$ and $M_t^1$, wherein, $M_t^0$ refers to a weight matrix from an input layer to a hidden layer of the GCN at the time t; $M_t^1$ refers to a weight matrix from the hidden layer to an output layer of the GCN at the time t. Since the initialization processes of these two weight matrixes: $M_t^0$ and $M_t^1$ are the same, in specific procedure of initialization, both of these two weight matrixes $M_t^0$ and $M_t^1$ may be expressed as $M_t$.

Specifically, any weight matrix $M_t$ of the GCN can be initialized according to the following expression.

$$M_t = \begin{bmatrix} m_{1,1} & m_{1,2} & m_{1,3} & \cdots & m_{1,n} \\ m_{2,1} & m_{2,2} & m_{2,3} & \cdots & m_{2,n} \\ m_{3,1} & m_{3,2} & m_{3,3} & \cdots & m_{3,n} \\ \vdots & \vdots & \vdots & \ddots & \vdots \\ m_{n,1} & m_{n,2} & m_{n,3} & \cdots & m_{n,n} \end{bmatrix}$$

Wherein, $m_{i,j}$ represents an initial value of a personnel flow weight between node i and node j. n represents the number of nodes in the MAN.

Specifically, when there is no direct influence of personnel flows between node i and node j in the MAN, $m_{i,j}=0$. Otherwise, the initial value of a personnel flow weight between node i and node j mid may be set as a reciprocal of the distance between the nodes, that is, $$m_{i,j} = \frac{1}{d_{(i,j)}}.$$

Wherein, $d_{(i,j)}$ represents a physical straight-line distance between node i and node j.

In some examples of the present disclosure, when node i and node j are both in a same area, such as, both in the office area, there would be no direct influence of personnel flows between node i and node j.

In some other examples of the present disclosure, when traffic of node i or node j changes, there would be a direct influence of personnel flows between node i and node j.

After initializing the parameters of the GCN, the GCN should be trained before being used to extract traffic spatial features. The training process of the GCN will be discussed later.

In block 504, the traffic spatial features are obtained from the spatial feature extraction model by inputting the adjacency matrix and the network state feature matrix into the spatial feature extraction model.

By inputting the adjacency matrix $A_t$, the network state feature matrix $Z_t$ into the GCN, the network traffic spatial features at the time t can be obtained from outputs of the GCN.

In examples of the disclosure, the network traffic spatial features can be denoted as a traffic spatial feature matrix $X_t$. The traffic spatial feature matrix $X_t$ may be calculated via the following expressions.

$$X_t = \sigma\left(L_t \text{ReLU}\left(L_t Z_t M_t^0\right) M_t^1\right)$$

$$L_t = D_t^{-1/2} \tilde{A}_t D_t^{-1/2}$$

$$\tilde{A}_t = A_t + I_n$$

$$D_{i,i} = \sum_j \tilde{A}_{i,j}$$

$$D_t = \begin{bmatrix} D_{1,1} & D_{1,2} & D_{1,3} & \cdots & D_{1,n} \\ D_{2,1} & D_{2,2} & D_{2,3} & \cdots & D_{2,n} \\ D_{3,1} & D_{3,2} & D_{3,3} & \cdots & D_{3,n} \\ \vdots & \vdots & \vdots & \ddots & \vdots \\ D_{n,1} & D_{n,2} & D_{n,3} & \cdots & D_{n,n} \end{bmatrix}$$

Wherein, σ represents a Sigmoid activation function; $L_t$ represents a Laplace transform matrix; $Z_t$ represents the network state feature matrix; $M_t^0$ represents the personnel flow weight matrix from an input layer to a hidden layer of a GCN; $M_t^1$ represents the personnel flow weight matrix from the hidden layer to an output layer of the GCN; $\tilde{A}_t$ represents the adjacency matrix after a diagonal unitization; $\tilde{A}_{i,j}$ represents an element in the adjacency matrix $\tilde{A}_t$; $D_{i,i}$ represents a sum of elements in line i in the adjacency matrix $\tilde{A}_t$, and $D_t$ represents a diagonal matrix related to $A_t$.

It can be seen that through the above process, traffic spatial features of the nodes in the MAN can be obtained.

Figure 6:
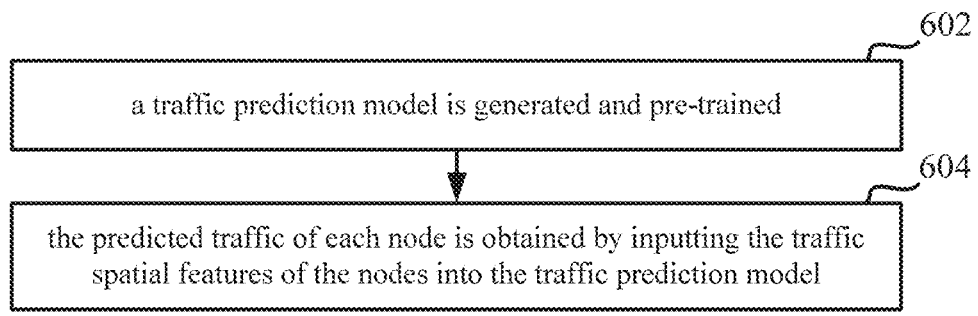
FIG. 6 illustrates a method for obtaining predicted traffic according to examples of the present disclosure.

FIG. 6 illustrates a method for obtaining predicted traffic according to examples of the present disclosure. As shown in FIG. 6, the method may include the following steps.

In block 602, a traffic prediction model is generated and pre-trained.

In examples of the present disclosure, the predicted traffic can be obtained from the traffic spatial features through a traffic prediction model. Specifically, an LSTM, an RNN or a GRU may be adopted as the traffic prediction model.

One would understand that the GRU is a common gated recurrent neural network, which uses a gating mechanism to control information such as input and memory to make predictions at a current time step. Its expression may include:

$$z = \sigma(x_t U^z + s_{t-1} W^z)$$

$$r = \sigma(x_t U^r + s_{t-1} W^r)$$

$$h = \tanh(x_t U^h + (s_{t-1} \circ r) W^h)$$

$$s_t = (1-z) \circ h + z \circ s_{t-1}$$

In examples of the present disclosure, while generating a GRU, weight parameters Wu, Wr, Wc, bu, br and bc may be initialized at first. These weight parameters would be initialized as pre-determined values.

After initializing the weight parameters of the GRU, the GRU should be trained before being used to extract traffic temporal features. The training process of the GRU will be discussed later.

In block 604, the predicted traffic of each node is obtained from the traffic prediction model by inputting the traffic spatial features of the nodes into the traffic prediction model.

In examples of the present disclosure, predicted traffic of node v can be obtained according to the traffic spatial features $x_t^{(v)}$ of node v in the traffic spatial feature matrix $X_t$, in combination with pre-trained weight parameters Wu, Wr, Wc, bu, br and bc. The predicted traffic may refer to the following expressions.

$$u_t^{(v)} = \sigma(W_u[x_t^{(v)}, h_{t-T}] + b_u)$$

$$r_t^{(v)} = \sigma(W_r[x_t^{(v)}, h_{t-T}] + b_r)$$

$$c_t^{(v)} = \tanh(W_c[x_t^{(v)}, (r_t^{(v)} * h_{t-T})] + b_c)$$

$$h_t^{(v)} = u_t^{(v)} \cdot h_{t-T}^{(v)} + (1 - u_t^{(v)}) \cdot c_t^{(v)}$$

Wherein, σ represents a Sigmoid activation function; $u_t^{(v)}$ represents an output of a reset gate; $r_t^{(v)}$ represents an output of an update gate; $c_t^{(v)}$ represents an output of a gated recurrent unit; $h_t^{(v)}$ represents the predicted traffic of node v; and $h_{t-T}$ represents historical traffic data corresponding to a previous time step.

It can be seen that through the above process, the predicted traffic of the nodes in the MAN can be obtained.

Figure 7:
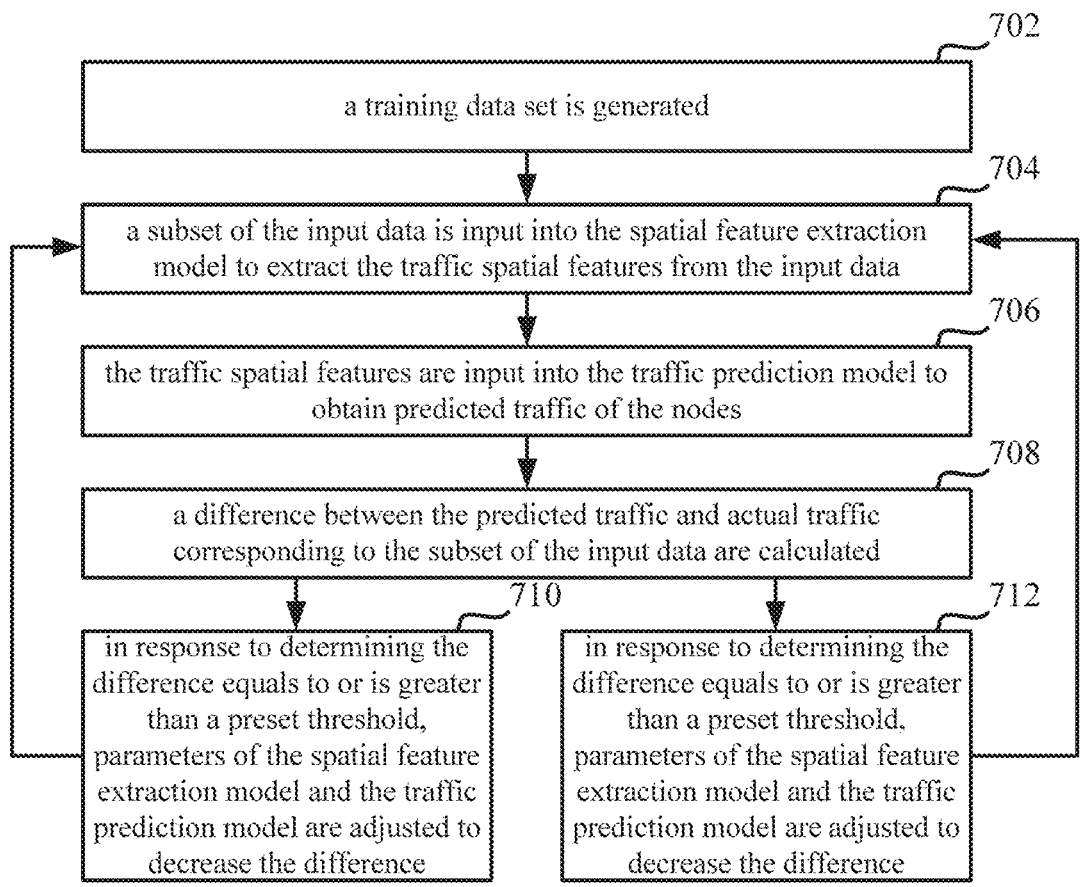
FIG. 7 illustrates a method for training the traffic spatial feature extraction model and the traffic prediction model according to examples of the present disclosure.

FIG. 7 illustrates a method for training the traffic spatial feature extraction model and the traffic prediction model according to examples of the present disclosure. As shown in FIG. 7, the method may include the following steps.

In block 702, a training data set is generated.

In examples of the present disclosure, the training set may include a plurality of subset of input data and a plurality of corresponding output data. A subset of input data may include an adjacency matrix and a network state feature matrix of a MAN. The corresponding output data may include actual traffic of nodes in the MAN corresponding to the subset of input data. The training data set may be generated according to historical traffic data.

In block 704, a subset of the input data is input into the spatial feature extraction model to extract the traffic spatial features from the input data.

In block 706, the traffic spatial features are input into the traffic prediction model to obtain predicted traffic of the nodes.

In block 708, a difference between the predicted traffic and actual traffic corresponding to the subset of the input data are calculated.

On would understand that a difference between the predicted traffic and actual traffic corresponding to the subset of the input data may exist.

In some examples of the present disclosure, the difference between the predicted traffic and actual traffic corresponding to the subset of the input data may refer to a mean absolute percentage error (MAPE) between the predicted traffic and actual traffic. Specifically, the MAPE may be calculated according to the following expression.

$$MAPE = \frac{1}{p} \cdot \sum_{q=1}^{p} \left| \frac{h_t^{(v)} - y_t^{(v)}}{y_t^{(v)}} \right|$$

Wherein, p represents the number of subsets of input data for node v at the time t; q represents the number of subsets of input data for node v at the time t is at least 1; $h_t^{(v)}$ represents the predicted traffic of node v at the time t; and $y_t^{(v)}$ represents the actual traffic of node v at the time t.

One can understand that the smaller the MAPE is, the more accurate the prediction is.

In block 710, in response to determining the difference equals to or is greater than a preset threshold, parameters of the spatial feature extraction model and the traffic prediction model should be adjusted to decrease the difference and return to block 704 until a preset number of training is completed.

Specifically, in this process, the weight matrix at a time t $M_t$ of the GCN and weight parameters Wu, Wr, Wc, bu, br and be of the GRU should be updated according to the differences.

In examples of the present disclosure, the preset threshold may be set as 0.2.

In block 712, in response to determining the difference is less than the preset threshold, return to block 704 until a preset number of training is completed.

Through the above process the spatial feature extraction model and the traffic prediction model can be pre-trained.

Figure 8:
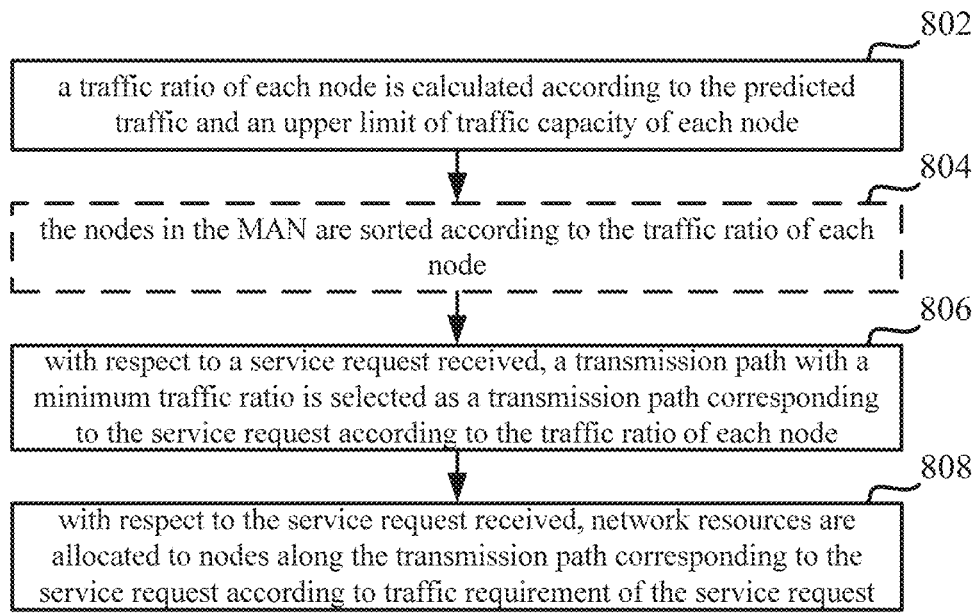
FIG. 8 illustrates a method of network resources allocation according to examples of the present disclosure.

FIG. 8 illustrates a method of network resources allocation according to examples of the present disclosure. As shown in FIG. 8, the method may include the following steps.

In block 802, a traffic ratio of each node is calculated according to the predicted traffic and an upper limit of traffic capacity of each node.

In examples of the present disclosure, the traffic ratio of a node may refer to a ration between an uplink and downlink throughput of the node to the upper limit of traffic capacity of the node. The upper limit of traffic capacity of each node may be predetermined.

For example, the traffic ratio $\alpha_t^{(v)}$ of node v at a current time t can be calculated as a ratio between the traffic of node v at the current time t and the upper limit of traffic capacity of node v. Further, the traffic ratio of other nodes in the MAN can be calculated one by one.

In this example, it is assumed that the traffic ratios of the 14 nodes at the time t are listed in the following Table 1:

TABLE 1

| $\alpha_t^{(1)}$ | $\alpha_t^{(2)}$ | $\alpha_t^{(3)}$ | $\alpha_t^{(4)}$ | $\alpha_t^{(5)}$ | $\alpha_t^{(6)}$ | $\alpha_t^{(7)}$ | $\alpha_t^{(8)}$ | $\alpha_t^{(9)}$ | $\alpha_t^{(10)}$ | $\alpha_t^{(11)}$ | $\alpha_t^{(12)}$ | $\alpha_t^{(13)}$ | $\alpha_t^{(14)}$ |
|---|---|---|---|---|---|---|---|---|---|---|---|---|---|
| 0.58 | 0.37 | 0.28 | 0.22 | 0.11 | 0.64 | 0.52 | 0.18 | 0.87 | 0.92 | 0.83 | 0.23 | 0.12 | 0.19 |

Under the guidance of the predicted traffic $h_t^{(v)}$ node v, traffic ratio of node v at a future time t+1 can also be calculated. Further, the traffic ratio of other nodes in the MAN at the future time t+1 can be calculated one by one.

In this example, it is assumed that the traffic ratios of the 14 nodes at the time t+1 are listed in the following Table 2:

TABLE 2

| $\alpha_{t+1}^{(1)}$ | $\alpha_{t+1}^{(2)}$ | $\alpha_{t+1}^{(3)}$ | $\alpha_{t+1}^{(4)}$ | $\alpha_{t+1}^{(5)}$ | $\alpha_{t+1}^{(6)}$ | $\alpha_{t+1}^{(7)}$ | $\alpha_{t+1}^{(8)}$ | $\alpha_{t+1}^{(9)}$ | $\alpha_{t+1}^{(10)}$ | $\alpha_{t+1}^{(11)}$ | $\alpha_{t+1}^{(12)}$ | $\alpha_{t+1}^{(13)}$ | $\alpha_{t+1}^{(14)}$ |
|---|---|---|---|---|---|---|---|---|---|---|---|---|---|
| 0.24 | 0.15 | 0.72 | 0.74 | 0.91 | 0.22 | 0.59 | 0.24 | 0.15 | 0.21 | 0.87 | 0.35 | 0.45 | 0.32 |

Because the traffic throughput of a node cannot exceed the upper limit of the traffic capacity of the node, the following limitation should be satisfied: $0 \leq \alpha_t^{(v)} \leq 1$ and $0 \leq \alpha_{t+1}^{(v)} \leq 1$.

In block 804, the nodes in the MAN are sorted according to the traffic ratio of each node.

In examples of the present disclosure, the above step is optional. In this step, the nodes in the MAN can be sorted in a descending order or an ascending order according to the traffic ratio of each node.

The aim of sorting the nodes in a descending order or an ascending order is to facilitate a calculation of a sum of traffic ratios of a group of nodes therefore to select an optimal transmission path with a minimum traffic ratio. Here, the traffic ratio of a transmission path refers to a sum of traffic ratios of nodes along the transmission path.

For example, by comparing the traffic ratios $\alpha_t^{(v)}$ of all the 14 nodes in the MAN, all the 14 nodes are sorted in a descending order to obtain a sequence $\{\alpha_t^{(10)}, \alpha_t^{(9)}, \alpha_t^{(11)}, \alpha_t^{(6)}, \alpha_t^{(1)}, \alpha_t^{(7)}, \alpha_t^{(2)}, \alpha_t^{(3)}, \alpha_t^{(12)}, \alpha_t^{(4)}, \alpha_t^{(14)}, \alpha_t^{(8)}, \alpha_t^{(13)}, \alpha_t^{(5)}\}$. In the sequence, the numbers 1 to 14 refer to the serial number of the nodes.

In block 806, with respect to a service request received, a candidate transmission path from a source node of the service request to a destination node of the service request with a minimum traffic ratio is selected as a transmission path corresponding to the service request according to the traffic ratio of each node.

As stated above, the traffic ratio of a transmission path refers to the sum of traffic ratios of the nodes along the transmission path.

Therefore, in this block, with regard to the service request received, a plurality of candidate transmission paths corresponding to the service request should be determined according to physical connections between the nodes (network topology) first. Then, the traffic ratio of each candidate transmission path should be calculated according to the traffic ration of each node. Moreover, the candidate transmission path with the minimum traffic ratio should be selected as the transmission path corresponding to the service request.

For example, it is assumed that a service request from node 11 to node 4 is received. According to network topology of the MAN, there are three candidate transmission paths which can complete the service.

Candidate transmission path 1: node 11-node 10-node 7-node 4.

Candidate transmission path 2: node 11-node 10-node 8-node 4.

Candidate transmission path 3: node 11-node 9-node 8-node 4.

According to the above method, the traffic ratio of each of the three candidate transmission paths is calculated. That is, for each candidate transmission path, the sum of the traffic ratios of the nodes along the candidate transmission path is calculated. In this example, the results of the above-mentioned calculation may be denoted as the following:

$$\alpha_t^{(11)}+\alpha_t^{(10)}+\alpha_t^{(7)}+\alpha_t^{(4)}=0.82+0.21+0.59+0.74=2.41$$

$$\alpha_t^{(11)}+\alpha_t^{(10)}+\alpha_t^{(8)}+\alpha_t^{(4)}=0.87+0.21+0.24+0.74=2.06$$

$$\alpha_t^{(11)}+\alpha_t^{(9)}+\alpha_t^{(8)}+\alpha_t^{(4)}=0.87+0.15+0.24+0.74=2.00$$

It is apparent that Candidate transmission path 3 is the transmission path with the minimum traffic ratio. Therefore, Candidate transmission path 3 would be selected as the transmission path corresponding to the service request.

In block 808, with respect to the service request received, network resources are allocated to nodes along the transmission path corresponding to the service request according to traffic required by the service request.

In some other examples of the present disclosure, besides the traffic ration of the nodes along the transmission path, capacity of each node along the transmission path should also be considered while selecting the transmission path corresponding to the service request.

That is, after block 806, it is further determined whether network resources along the transmission path is sufficient for the traffic required by the service request. In response to determining that the network resources along the transmission path is sufficient for the traffic required by the service request, proceed to block 808. In response to determining that the network resources along the transmission path is not sufficient for the traffic required by the service request, a candidate transmission path with a little more traffic ratio and with sufficient network resources would be selected as the transmission path corresponding to the service request.

In particular, in response to determining that no candidate transmission path has sufficient network resources, the service request would be denied or rejected.

In examples of the present disclosure, whether the network resources along the transmission path is sufficient can be determined when a leftover bandwidth of each of the nodes along the transmission path is greater or equal to the traffic required by the service request.

In the above example, if there are sufficient network resources along Candidate transmission path 3, the above block 808 may be performed to complete network resources allocation to the nodes along Candidate transmission path 3.

If there are no sufficient network resources along Candidate transmission path 3, it is determined whether there are sufficient network resources along Candidate transmission path 2.

If there are sufficient network resources along Candidate transmission path 2, the above block 808 may be performed to complete network resources allocation to the nodes along Candidate transmission path 2.

If there are no sufficient network resources along Candidate transmission path 2, it is determined whether there are sufficient network resources along Candidate transmission path 1.

If there are sufficient network resources along Candidate transmission path 1, the above block 808 may be performed to complete network resources allocation to the nodes along Candidate transmission path 1.

If there are no sufficient network resources along Candidate transmission path 1, the service request would be rejected.

Through the above process, network resources can be allocated to nodes in the MAN according to the traffic ration of each node.

It should be noted that, every node of the MAN would be regarded as an entity to perform the method of network resource allocation described above. Alternatively, an independent managing entity can also be used to perform the method of network resource allocation described above.

It should be noted that the method in the example of the present disclosure may be executed by a single device, such as a computer or a server. The method in this example may also be applied in a distributed scenario and completed by cooperation of a plurality of devices. In this distributed scenario, one of the plurality of devices may only execute one or more steps in the method of the example of the present disclosure, and the plurality of devices may interact with each other to complete the method.

It should be noted that some examples of the present disclosure are described above. Other examples are within the scope of the appended claims. In some cases, the operations or steps described in the claims may be performed in an order different from that in the above-mentioned examples and still achieve the desired results. In addition, the processes described in the drawings do not necessarily require a particular order shown or a sequential order to achieve the desired results. In some examples, multitasking and parallel processing may be permissible or advantageous.

For example, the method for resource allocation may be used in the following scenario. In daily life, during an evening rush hour in a day, which is usually during 7:00 to 11:00 in the evening, there would be a sudden increase of network users in the residential area of the MAN. The method for resource allocation provided by examples of the present disclosure makes a real-time dynamic prediction of the nodes in the MAN by relying on a regular travelling pattern of people among the nodes in a certain area, which can find the network traffic tide caused by the sudden increase of network users in advance. Based on the above information, inflow bandwidth and outflow bandwidth of the nodes would be predicted. Further, the network resource allocation would be performed based on the predicted traffic, and then routing, modulation and spectrum allocation strategies of the MAN can be adjusted in real time to ensure a smooth operation of the MAN and improve network resources utilization of the MAN.

Based on the same concept, corresponding to the method in any of the above examples, the present disclosure further provides a device of network resource allocation.

Figure 9:
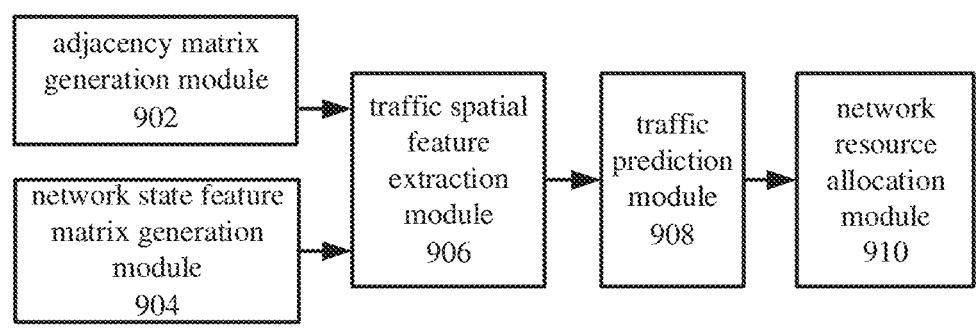
FIG. 9 is a diagram illustrating a structure of a device of network resource allocation according to examples of the present disclosure.

Referring to FIG. 9, the device of network resource allocation may include the following modules.

An adjacency matrix generation module 902, configured to generate an adjacency matrix of nodes in the MAN according to spatial adjacency relationships of the nodes.

A network state feature matrix generation module 904, configured to generate a network state feature matrix according to traffic information of each of the nodes.

A traffic spatial feature extraction module 906, configured to extract traffic spatial features of the nodes from the adjacency matrix and the network state feature matrix through a traffic spatial feature extraction model.

A traffic prediction module 908, configured to obtain predicted traffic of the nodes from the traffic spatial features through a traffic prediction model.

A network resource allocation module 910, configured to perform a network resource allocation according to the predicted traffic of the nodes.

To be noted, each of the above modules would implement its functions according to the methods described above.

For the convenience of description, when the above apparatus is described, the functions are divided into various modules and described respectively. Of course, when the present disclosure is implemented, the functions of various modules may be implemented in the same one or more software and/or hardware.

The apparatus in the foregoing example is used to implement the corresponding network resource allocation method in any of the foregoing examples, and has the beneficial effects of the corresponding method.

Based on the same concept, corresponding to the method in any of the above examples, the present disclosure further provides an electronic device, including a memory, a processor, and a computer program stored in the memory and executable on the processor, wherein the processor executes the program to implement the network resource allocation method according to any of the above examples.

Figure 10:
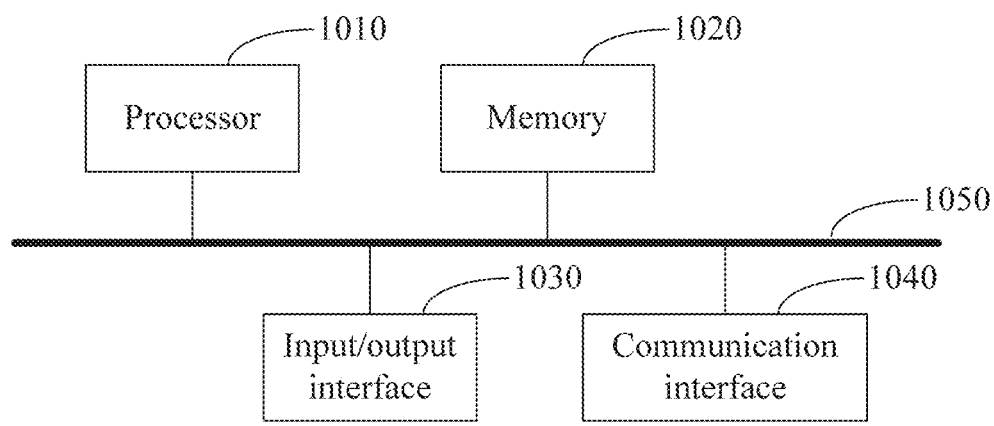
FIG. 10 is a diagram illustrating a structure of an electronic device according to some examples of the present disclosure.

FIG. 10 illustrates a more detailed structural schematic diagram of electronic device hardware provided by the example, the device may comprise a processor 1010, a memory 1020, an input/output (I/O) interface 1030, a communication interface 1040 and a bus 1050. The processor 1010, the memory 1020, the I/O interface 1030 and the communication interface 1040 are in a communication connection with each other within the device via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures; when the technical solution provided by the example of the Description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The electronic device according to the foregoing examples is used for implementing the corresponding method of network resource allocation in any one of the foregoing examples, and has the beneficial effects of the corresponding method examples, which are not repeated in detail.

The flowcharts and block diagrams in the drawings illustrate the system architecture, functionality, and operation possibly implemented by systems, methods and computer program products according to various examples of the present invention. In this regard, each block in the flowcharts or block diagrams may represent a unit, program segment, or portion of code, which comprises one or more executable instructions for implementing the specified logical function(s). It should be also noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be also noted that each block and combination of blocks in the flowcharts or block diagrams can be implemented by special purpose hardware-based systems which perform the specified functions or steps, or combinations of special purpose hardware and computer instructions.

The units or units involved in the examples of the present disclosure may be implemented by means of software or programmable hardware. The depicted units or units may be also arranged in the processor, and the titles of these units or units do not constitute the definition thereof in some cases.

Based on the same inventive concept, corresponding to the methods according to any one of the foregoing examples, the present disclosure further provides a non-transient computer readable storage medium which stores a computer instruction used for enabling the computer to perform the method of network resource allocation according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

The computer instruction stored by the storage medium according to the foregoing examples is used for enabling the computer to perform the method of network resource allocation according to any one of the examples, and has the beneficial effects of the corresponding method examples, which are not repeated in detail.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A method of network resource allocation, comprising:
generating an adjacency matrix of nodes in a metropolitan area network (MAN) according to spatial adjacency relationships of the nodes;
generating a network state feature matrix according to traffic information of each of the nodes;
extracting traffic spatial features of the nodes from the adjacency matrix and the network state feature matrix through a traffic spatial feature extraction model;
obtaining predicted traffic of the nodes from the traffic spatial features through a traffic prediction model; and
performing a network resource allocation according to the predicted traffic of the nodes; wherein,
the generating an adjacency matrix of nodes comprises:
obtaining a dynamic network state graph of the MAN;
dividing the dynamic network state graph into a number of static network state graphs according to a certain time step; wherein, each static network state graph corresponds to a time point;
analyzing a static network state graph to obtain nodes and edges among the nodes corresponds to the time point of the static network state graph; and
obtaining the spatial adjacency relationships of the nodes according to the edges among the nodes; wherein, a spatial adjacency relationship of any two nodes is determined according to a fact whether a physical link exists between the two nodes; and
generating the adjacency matrix of the nodes according to the spatial adjacency relationships of the nodes.

2. The method according to claim 1, wherein, the adjacency matrix of the nodes $A_t$ at time t is generated according to the following expression:

$$A_t = \begin{bmatrix} a_{1,1} & a_{1,2} & a_{1,3} & \cdots & a_{1,n} \\ a_{2,1} & a_{2,2} & a_{2,3} & \cdots & a_{2,n} \\ a_{3,1} & a_{3,2} & a_{3,3} & \cdots & a_{3,n} \\ \vdots & \vdots & \vdots & \ddots & \vdots \\ a_{n,1} & a_{n,2} & a_{n,3} & \cdots & a_{n,n} \end{bmatrix}$$

wherein $a_{i,j}$ represents a spatial adjacency relationship between node i and node j in the MAN, when there is a physical link between node i and node j, $a_{i,j}=1$, otherwise, $a_{i,j}=0$; n represents a number of nodes.

3. The method according to claim 1, wherein, generating a network state feature matrix comprises:
obtaining the traffic information of each of the nodes;
generating a network state feature vector for each node according to traffic information of the node; wherein, a dimension of a network state feature vector equals to a number of types of the traffic information; and
generating the network state feature matrix according to the network state feature vector of each node.

4. The method according to claim 1, wherein, generating a network state feature matrix comprises:
generating and pre-training a spatial feature extraction model; and
obtaining the traffic spatial features from the spatial feature extraction model by inputting the adjacency matrix and the network state feature matrix into the spatial feature extraction model.

5. The method according to claim 4, wherein the spatial feature extraction model is Graph Convolutional Network (GCN); and generating the spatial feature extraction model comprises:
initializing a weight matrix of the GCN according to the following expression:

$$M_t = \begin{bmatrix} m_{1,1} & m_{1,2} & m_{1,3} & \cdots & m_{1,n} \\ m_{2,1} & m_{2,2} & m_{2,3} & \cdots & m_{2,n} \\ m_{3,1} & m_{3,2} & m_{3,3} & \cdots & m_{3,n} \\ \vdots & \vdots & \vdots & \ddots & \vdots \\ m_{n,1} & m_{n,2} & m_{n,3} & \cdots & m_{n,n} \end{bmatrix}$$

wherein $m_{i,j}$ represents an initial value of a personnel flow weight between node i and node j; in response to determining there is no direct influence of personnel flows between node i and node j, $m_{i,j}=0$; otherwise, $$m_{i,j} = \frac{1}{d_{(i,j)}};$$

$d_{(i,j)}$ represents a physical straight-line distance between node i and node j.

6. The method according to claim 5, wherein, the network traffic spatial features are expressed as a traffic spatial feature matrix $X_t$;

obtaining the traffic spatial features from the spatial feature extraction model by inputting the adjacency matrix and the network state feature matrix into the spatial feature extraction model comprises:
calculating the traffic spatial feature matrix $X_t$ via the following expressions.

$$X_t = \sigma(L_t \text{ReLU}(L_t Z_t M_t^0) M_t^1)$$

$$L_t = D_t^{-1/2} \tilde{A}_t D_t^{-1/2}$$

$$\tilde{A}_t = A_t + I_n$$

$$D_{i,i} = \sum_j \tilde{A}_{i,j}$$

$$D_t = \begin{bmatrix} D_{1,1} & D_{1,2} & D_{1,3} & \cdots & D_{1,n} \\ D_{2,1} & D_{2,2} & D_{2,3} & \cdots & D_{2,n} \\ D_{3,1} & D_{3,2} & D_{3,3} & \cdots & D_{3,n} \\ \vdots & \vdots & \vdots & \ddots & \vdots \\ D_{n,1} & D_{n,2} & D_{n,3} & \cdots & D_{n,n} \end{bmatrix}$$

wherein $\sigma$ represents a Sigmoid activation function; $L_t$ represents a Laplace transform matrix;

$Z_t$ represents the network state feature matrix; $M_t^0$ represents the personnel flow weight matrix from an input layer to a hidden layer of a GCN; $M_t^1$ represents the personnel flow weight matrix from the hidden layer to an output layer of the GCN; $\tilde{A}_t$ represents the adjacency matrix after a diagonal unitization; $\tilde{A}_{i,j}$ represents an element in the adjacency matrix $\tilde{A}_t$; $D_{i,j}$ represents a sum of elements in line i in the adjacency matrix $\tilde{A}_t$, and $D_t$ represents a diagonal matrix related to $A_t$.

7. The method according to claim 4, wherein, obtaining predicted traffic of the nodes comprises:

generating and pre-training a traffic prediction model; and
obtaining the predicted traffic of each node from the traffic prediction model by inputting the traffic spatial features of the nodes into the traffic prediction model.

8. The method according to claim 7, wherein, traffic prediction model comprises:
a Long Short-Term Memory (LSTM) or a Recurrent Neural Network (RNN).

9. The method according to claim 7, wherein, traffic prediction model comprises a Gated Recurrent Unit (GRU);

obtaining the predicted traffic of each node from the traffic prediction model by inputting the traffic spatial features of the nodes into the traffic prediction model comprises:
obtaining the predicted traffic of node v according to the traffic spatial features $x_t^{(v)}$ of node v in the traffic spatial feature matrix $X_t$, in combination with pre-trained weight parameters $W_u$, $W_r$, $W_c$, $b_u$, $b_r$ and $b_c$ based on the following expressions:

$$u_t^{(v)} = \sigma(W_u[x_t^{(v)}, h_{t-T}] + b_u)$$

$$r_t^{(v)} = \sigma(W_r[x_t^{(v)}, h_{t-T}] + b_r)$$

$$c_t^{(v)} = \tanh(W_c[x_t^{(v)}, (r_t^{(v)} * h_{t-T})] + b_c)$$

$$h_t^{(v)} = u_t^{(v)} \cdot h_{t-T}^{(v)} + (1 - u_t^{(v)}) \cdot c_t^{(v)}$$

wherein $\sigma$ represents a Sigmoid activation function; $u_t^{(v)}$ represents an output of a reset gate; $r_t^{(v)}$ represents an output of an update gate; $c_t^{(v)}$ represents an output of a gated recurrent unit; $h_t^{(v)}$ represents the predicted traffic of node v; and $h_{t-T}$ represents historical traffic data corresponding to a previous time step.

10. The method according to claim 7, wherein, pre-training the spatial feature extraction model and the traffic prediction model comprises:

generating a training data set; wherein the training set includes a plurality of subset of an adjacency matrix and a network state feature matrix of a MAN and a plurality of corresponding actual traffic of nodes in the MAN;

inputting a subset of the input data into the spatial feature extraction model to extract traffic spatial features from the input data;

inputting the traffic spatial features into the traffic prediction model to obtain predicted traffic of the nodes in the MAN;

calculating a difference between the predicted traffic and actual traffic corresponding to the subset of the input data; and in response to determining the difference equals to or is greater than a preset threshold, parameters of the spatial feature extraction model and the traffic prediction model are adjusted to decrease the difference.

11. The method according to claim 10, wherein, the difference between the predicted traffic and actual traffic corresponding to the subset of the input data comprises a mean absolute percentage error (MAPE) between the predicted traffic and actual traffic.

12. The method according to claim 1, wherein, performing a network resource allocation according to the predicted traffic of the nodes comprises:

calculating a traffic ratio of each node according to the predicted traffic and an upper limit of traffic capacity of each node;

with respect to a service request received, selecting a candidate transmission path from a source node of the service request to a destination node of the service request with a minimum traffic ratio as a transmission path corresponding to the service request according to the traffic ratio of each node; and with respect to the service request received, allocating network resources to nodes along the transmission path corresponding to the service request according to traffic required by the service request.

13. The method according to claim 11, wherein, the traffic ratio of a candidate transmission path is a sum of traffic ratios of nodes along the candidate transmission path.

14. The method according to claim 11, further comprising:
sorting the nodes in a descending order or an ascending order according to the traffic ratio of each node after calculating the traffic ratio of each node.

15. The method according to claim 11, further comprising:
determined whether network resources along the candidate transmission path is sufficient for traffic required by the service request before selecting the candidate transmission path as the transmission path corresponding to the service request;
in response to determining that the network resources along the candidate transmission path is sufficient for the traffic required by the service request, proceed to the step of selecting the candidate transmission path as the transmission path corresponding to the service request; and
in response to determining that the network resources along the transmission path is not sufficient for the traffic required by the service request, selecting a candidate transmission path with a little more traffic ratio and with sufficient network resources as the transmission path corresponding to the service request.

16. The method according to claim 15, further comprising:
in response to determining that no candidate transmission path has sufficient network resources, rejecting the service request received.

17. An electronic device, comprising a memory, a processor, and a computer program stored in the memory and executable on the processor, wherein the processor executes the program to
obtain a dynamic network state graph of a metropolitan area network (MAN);
divide the dynamic network state graph into a number of static network state graphs according to a certain time step; wherein, each static network state graph corresponds to a time point;
analyze a static network state graph to obtain nodes and edges among the nodes corresponds to the time point of the static network state graph;
obtain spatial adjacency relationships of the nodes according to the edges among the nodes;
wherein, a spatial adjacency relationship of any two nodes is determined according to a fact whether a physical link exists between the two nodes;
generate an adjacency matrix of the nodes according to the spatial adjacency relationships of the nodes;
generate a network state feature matrix according to traffic information of each of the nodes;
extract traffic spatial features of the nodes from the adjacency matrix and the network state feature matrix through a traffic spatial feature extraction model;
obtain predicted traffic of the nodes from the traffic spatial features through a traffic prediction model; and
perform a network resource allocation according to the predicted traffic of the nodes.

18. A non-transitory computer-readable storage medium, wherein the non-transitory computer-readable storage medium stores computer instructions, and the computer instructions are used to make the computer execute the following steps:
obtaining a dynamic network state graph of a metropolitan area network (MAN);
dividing the dynamic network state graph into a number of static network state graphs according to a certain time step; wherein, each static network state graph corresponds to a time point;
analyzing a static network state graph to obtain nodes and edges among the nodes corresponds to the time point of the static network state graph;
obtaining spatial adjacency relationships of the nodes according to the edges among the nodes;
wherein, a spatial adjacency relationship of any two nodes is determined according to a fact whether a physical link exists between the two nodes;
generating an adjacency matrix of the nodes according to the spatial adjacency relationships of the nodes;
generating a network state feature matrix according to traffic information of each of the nodes;
extracting traffic spatial features of the nodes from the adjacency matrix and the network state feature matrix through a traffic spatial feature extraction model;
obtaining predicted traffic of the nodes from the traffic spatial features through a traffic prediction model; and
performing a network resource allocation according to the predicted traffic of the nodes.

* * * * *